United States Patent
Hyun et al.

(10) Patent No.: US 7,522,944 B2
(45) Date of Patent: Apr. 21, 2009

(54) PORTABLE COMMUNICATION APPARATUS

(75) Inventors: Sang-Min Hyun, Seoul (KR); Jong-Seong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 604 days.

(21) Appl. No.: 10/921,030

(22) Filed: Aug. 18, 2004

(65) Prior Publication Data
US 2005/0090206 A1    Apr. 28, 2005

(30) Foreign Application Priority Data
Oct. 23, 2003    (KR) ............ 10-2003-0074307

(51) Int. Cl.
*H04M 1/00*    (2006.01)
(52) U.S. Cl. ............ 455/575.1; 455/575.3; 455/575.8
(58) Field of Classification Search ............ 455/575.1, 455/575.3, 90.3, 556.1; 379/454, 433.13
See application file for complete search history.

(56) References Cited

U.S. PATENT DOCUMENTS

| | | | | |
|---|---|---|---|---|
| 5,179,502 A | * | 1/1993 | Matsuda | 361/680 |
| 5,646,649 A | * | 7/1997 | Iwata et al. | 345/173 |
| 6,099,051 A | * | 8/2000 | Murphy et al. | 292/283 |
| 6,141,569 A | * | 10/2000 | Weisshappel et al. | 455/572 |
| 6,380,899 B1 | * | 4/2002 | Madsen et al. | 343/702 |
| 6,594,142 B2 | * | 7/2003 | Katz | 361/680 |
| 6,889,043 B2 | * | 5/2005 | Okazaki et al. | 455/435.1 |
| 2002/0089817 A1 | * | 7/2002 | Eisenbraun | 361/680 |
| 2004/0204194 A1 | * | 10/2004 | Akai et al. | 455/575.1 |
| 2006/0079298 A1 | * | 4/2006 | Saitoh et al. | 455/575.1 |

FOREIGN PATENT DOCUMENTS

| | | | | |
|---|---|---|---|---|
| JP | 06-119080 | * | 4/1994 | 1/16 |
| KR | 20-0301235 | | 1/2003 | |

* cited by examiner

*Primary Examiner*—Duc Nguyen
*Assistant Examiner*—Dominic E Rego
(74) *Attorney, Agent, or Firm*—The Farrell Law Firm, P.C.

(57) ABSTRACT

A portable communication apparatus including a first housing, a second housing, and a hinge unit for connecting the first housing and the second housing with each other. The hinge unit includes a hinge recess for storing a stylus.

9 Claims, 7 Drawing Sheets

PORTABLE COMMUNICATION APPARATUS

PRIORITY

This application claims priority to an application entitled "Portable Communication Apparatus" filed with the Korean Intellectual Property Office on Oct. 23, 2003 and assigned Serial No. 2003-74307, the contents of which are hereby incorporated by reference.

BACKGROUND OF THE INVENTION

1. Field of the Invention

The present invention relates to portable communication apparatuses, such as Palm PCs (personal computers), PDAs (personal digital assistants), HHPs (hand held phones), small notebooks, etc.

2. Description of the Related Art

In general, a "portable communication apparatus" refers to an electronic apparatus, which a user can carry, for performing wireless communication. Portable communication apparatuses are either wired or wireless. Further, a portable communication apparatus is necessarily equipped with a data input device, a data output device, and a battery for supplying electric power.

Keyboards, keypads, touchpads, and mice are known to the public as data input devices, and LCDs are usually used as data output devices. Additionally, touchscreens are an example a device that can be used as both an input and an output device.

In consideration of portability, designs of such portable communication apparatuses tend toward compactness, slimness, lightness, and multimedia availability, having a wider variety of functions.

More specifically, future portable communication apparatuses are expected to incorporate greater multi-functionality and multi-purpose utilization, and greater compactness and lightness. These future portable communication apparatuses will also be modified for various multimedia environments or Internet environments. Additionally, such portable communication apparatuses are now commonly used by all kinds of people, including both men and women, young and old, throughout the world, and are recognized by some people as a nearly indispensable commodity, which must be carried always.

A conventional portable communication apparatus usually has one housing, e.g., a bar type mobile telephone, or two housings, which can be rotated relatively to and from each other by means of a hinge unit, e.g., a folder type mobile telephone.

Further, the portable communication apparatuses may be classified into neck wearable type communication apparatuses and wrist wearable type communication apparatuses according to how they are carried by a user. For example, the neck wearable type communication apparatus is worn around the neck using a string, and the wrist wearable type communication apparatus worn around the wrist.

Additionally, the portable communication apparatuses may be classified into rotation-type communication apparatuses and sliding-type communication apparatuses according to ways of opening and closing the communication apparatuses. In the rotation-type portable communication apparatus, two housings are coupled to each other in such a manner that one housing rotates relative to the other while they face each other. In the sliding-type portable communication apparatus, two housings are coupled to each other in a manner that one housing slides relative to the other. These variously types of portable communication apparatuses are easily understood by those skilled in the art.

Recently, conventional portable communication apparatuses tend to transmit data at a high speed in addition to the basic function of performing voice communication. In other words, portable communication apparatuses now tend to provide a service using a wireless communication technology capable of transmitting data at a high speed.

Additionally, recent portable communication apparatuses tend to include a camera lens, which enables each of the communication apparatuses to capture and transmit an image signal.

However, few of the conventional portable communication apparatuses utilizing a touch screen as a data input device have a separate means for storing a stylus, which is preferable, if not necessary, for performing a data input operation. As a result, it is very common to lose the stylus in a conventional portable communication apparatus.

Further, in order to store a stylus, some conventional portable communication apparatuses include a string tied on the stylus. However, a string tied on a stylus deteriorates the external appearance of the portable communication apparatus and makes it inconvenient for a user to carry the portable communication apparatus.

SUMMARY OF THE INVENTION

Accordingly, the present invention has been designed to solve the above and other problems occurring in the prior art, and an object of the present invention is to provide a portable communication apparatus including a hinge recess for receiving a stylus and a battery cover for protecting a battery, so that the portable communication apparatus can store the stylus in a safe and convenient manner, and safely protect a thin plate-shaped battery from the environment.

Another object the present invention is to provide a portable communication apparatus including an easily unfoldable first and second housing, so that the portable communication apparatus can be easily opened.

In order to accomplish the above and other objects, there is provided a portable communication apparatus comprising: a first housing for seating a battery on an outer surface thereof; a second housing; a hinge unit for connecting the first housing and the second housing in such a manner that they can be rotated to approach or go away from each other, the hinge unit includes a hinge recess in which a stylus can be received; and a cover connected to the hinge unit in such a manner that the cover can be rotated concentrically to the hinge unit.

In accordance with another aspect of the present invention, there is provided a portable communication apparatus comprising: a plate-shaped first housing having an inner surface and an outer surface; a plate-shaped second housing having an inner surface and an outer surface, the first housing and the second housing being connected with a hinge unit in such a manner that they can be rotated to approach or go away from each other; and a hinge recess disposed between the first housing and the second housing, the hinge recess extending longitudinally along the hinge unit to receive a stylus therein.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
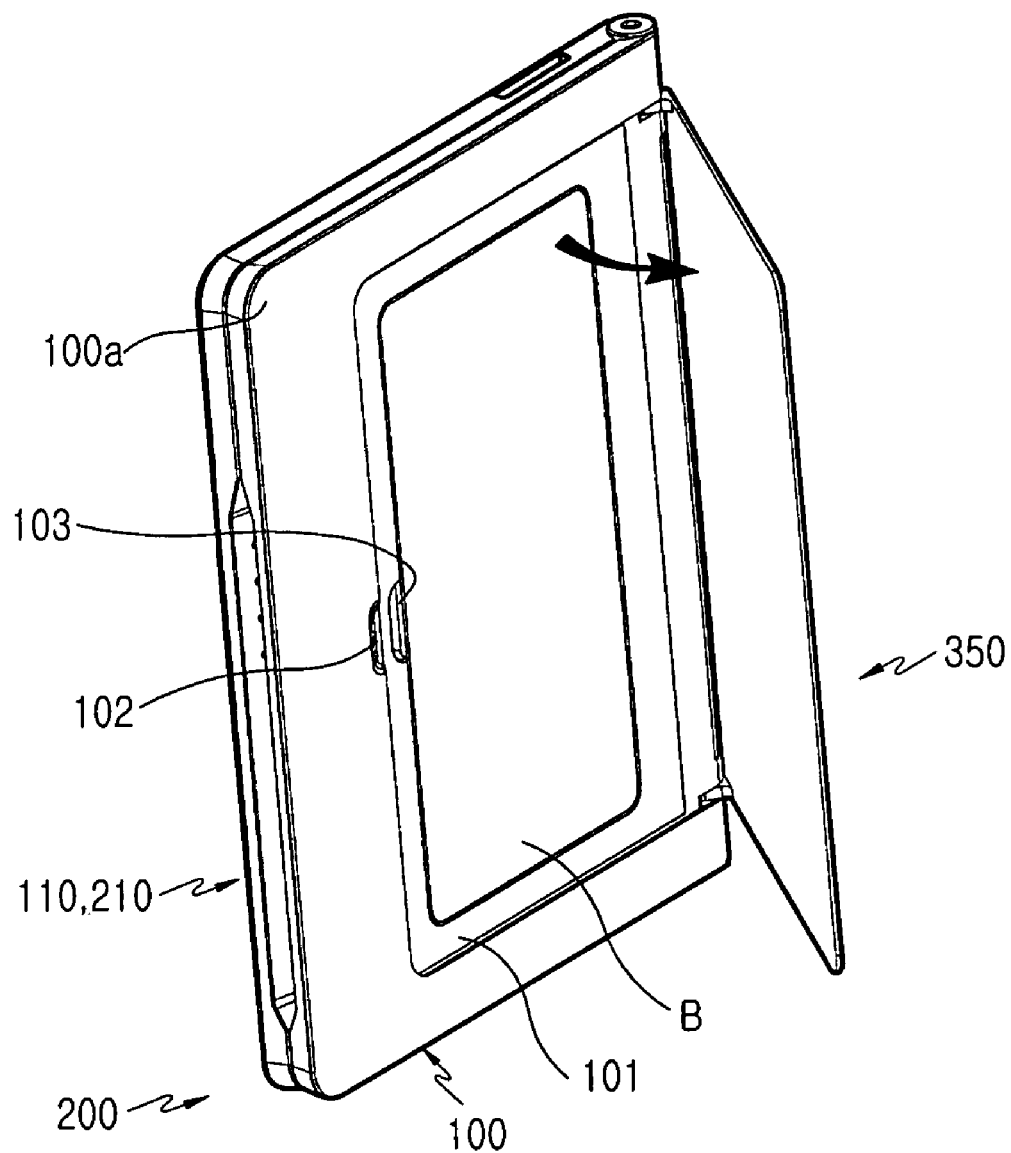
FIGS. 1 and 2 are perspective views of a portable communication apparatus according to a preferred embodiment of the present invention, in which a battery cover has been open at an angle.

Preferred embodiments of the present invention will be described in detail herein below with reference to the accompanying drawings. In the following description of the present invention, a detailed description of known functions and configurations incorporated herein will be omitted when it may make the subject matter of the present invention rather unclear.

As illustrated in FIGS. 1 to 5, a portable communication apparatus according to a preferred embodiment of the present invention comprises a first housing 100, a second housing 200, a hinge unit 300 for connecting the first housing 100 and the second housing 200, so that they can be opened/closed from/to each other, and a battery cover 350 for protecting a battery coupled with the first housing 100. The hinge unit 300 has a hinge recess 340 formed therein, in which a stylus S can be stored.

The first housing 100 is shaped like a plate and has an outer surface 100*a* and an inner surface 100*b*. A cover recess 101 having a predetermined shape is formed at the outer surface 100*a*, so that a battery B can be assembled in a battery seat formed in the cover recess 101. The cover recess 101 has a shape corresponding to that of the battery cover 350. When the battery cover 350 has been closed in the cover recess 101, the battery B is protected by the battery cover 350. However, when the battery cover 350 is opened, the battery B is exposed to an exterior. Accordingly, the cover recess 101 has a depth that is at least equal to the thickness of the battery cover 350.

Preferably, a first opener groove 102 is formed at a predetermined portion of a circumference of the cover recess 101 to facilitate the opening of the battery cover 350. Further, a second opener groove 103 is formed at a predetermined portion of the cover recess 101, to facilitate removing the battery B.

Figure 3:
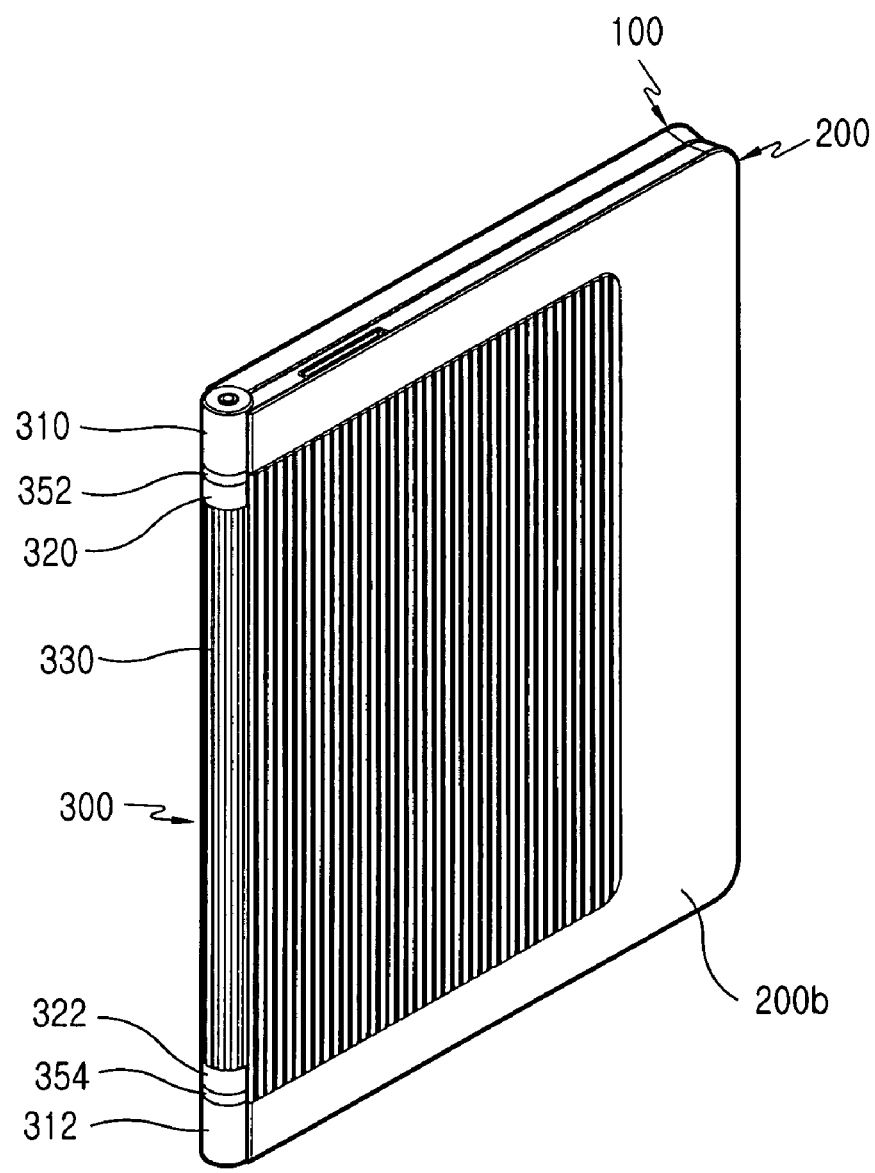
FIG. 3 is a rear perspective view of a portable communication apparatus according to a preferred embodiment of the present invention, in which a battery cover has been closed.

Referring to FIG. 3, the hinge unit 300 includes a pair of first side hinge arms 310 and 312, a pair of cover hinge arms 352 and 354, a pair of second side hinge arms 320 and 322, and a center hinge arm 330. The first side hinge arms 310 and 312 are disposed at outermost portions of the hinge unit 300, respectively. The cover hinge arms 352 and 354 are disposed adjacent to the first side hinge arms 310 and 312, respectively. The second side hinge arms 320 and 322 are disposed adjacent to the cover hinge arms 352 and 354, respectively. The center hinge arm 330 is disposed between the second side hinge arms 320 and 322. The first side hinge arms 310 and 312 and the second side hinge arms 320 and 322 are formed on the first housing 100, the center hinge arm 330 is formed on the second housing 200, and the cover hinge arms 352 and 354 are formed on the battery cover 350. However, instead of the above construction, the first side hinge arms 310 and 312 may be formed on the second housing 200 and the center hinge arm 330 may be formed on the first housing 100.

The hinge recess 340 is formed at the center hinge arm 330, which will be described in more detail later.

The second housing 200 has an inner surface 200*a* and an outer surface 200*b*. Preferably, the outer surface 200*b* has an appearance similar to the shape of the battery cover 350.

The first housing 100 has a first display 120 arranged on the inner surface 100*b* thereof, and the second housing 200 has a second display 220 arranged on the inner surface 200*a* thereof. The first display 120 and the second display 220 are symmetric to each other with reference to the hinge unit 300. More specifically, the first display 120 and the second display 220 are symmetric to each other with reference to the hinge recess 340. Herein, each of the first display 120 and the second display 220 may be an LCD, a touchscreen, or a hologram screen. Most preferably, each of the first display 120 and the second display 220 is a touchscreen.

A first groove 110 and a second groove 210 are formed at edges of the first housing 100 and the second housing 200, respectively, which are located farthest from the hinge unit 300, for facilitating unfolding of the first housing 100 and the second housing 200 from each other. The first groove 110 has a plurality of slant surfaces 111, 112, and 113, and at least one first key 114 is disposed on one of the slant surfaces 111, 112, and 113. Further, the second groove 210 has a plurality of slant surfaces 211, 212, and 213, and at least one second key 214 is disposed on one of the slant surfaces 211, 212, and 213. Preferably, the first groove 110 and the second groove 210 have shapes symmetrical to each other.

Figure 2:
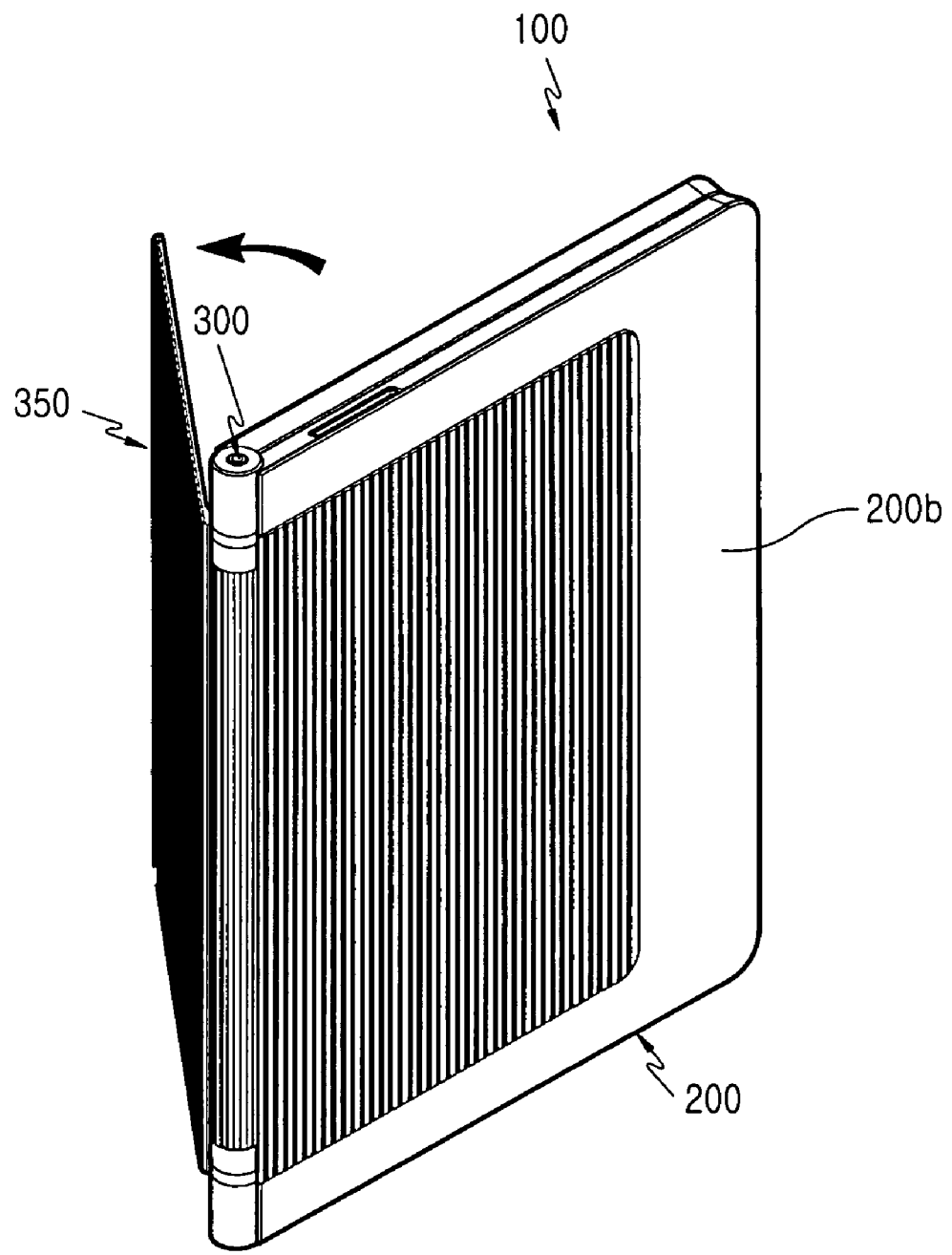
Figure 4:
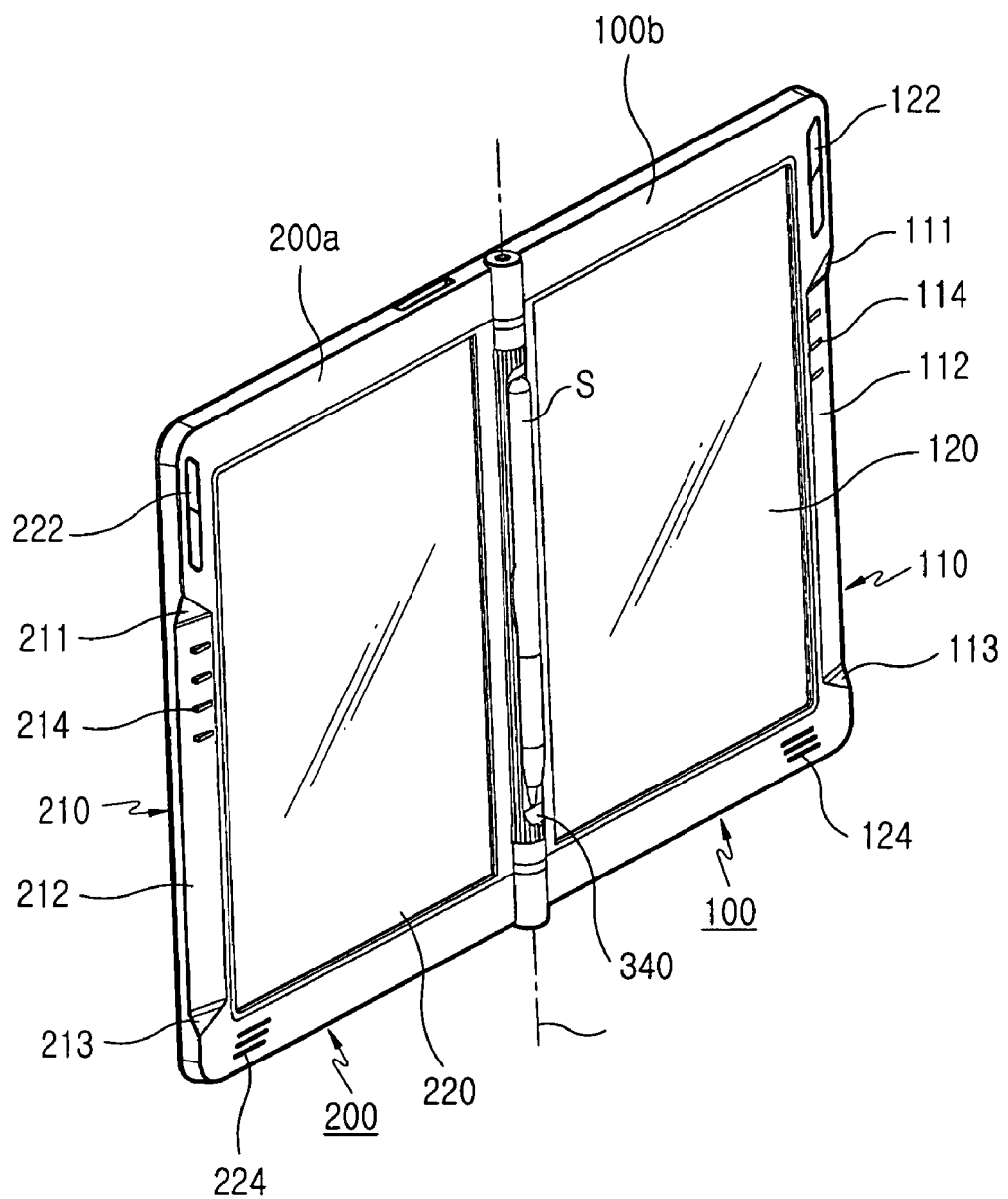
FIG. 4 is a perspective view of a portable communication apparatus according to a preferred embodiment of the present invention, in which a first housing and a second housing thereof are completely unfolded.
Figure 5:
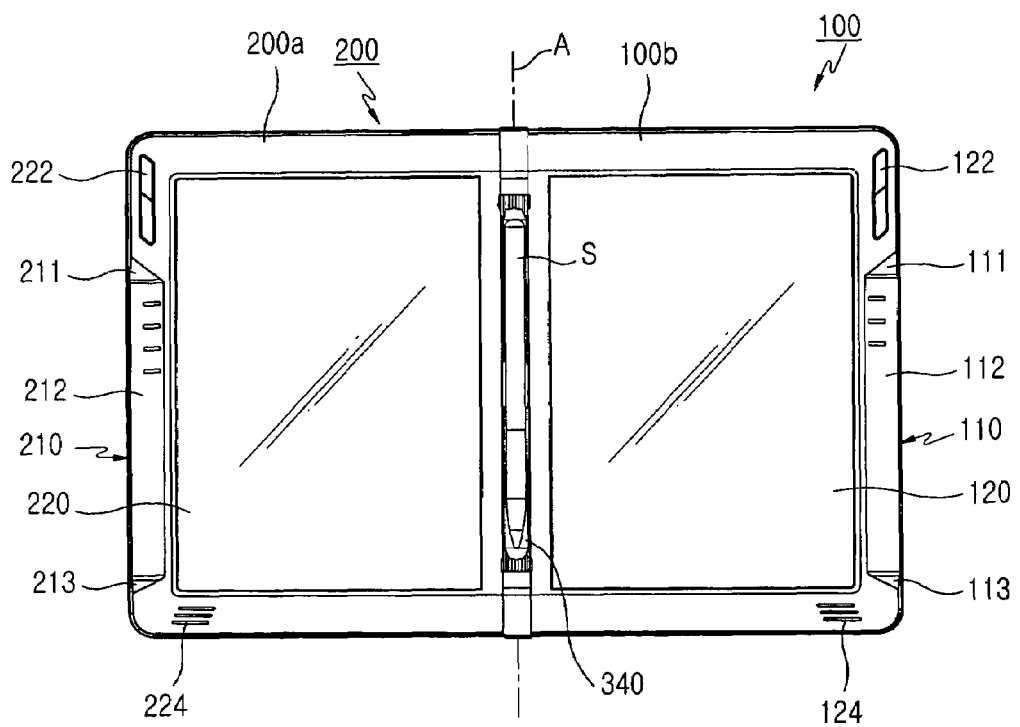
FIG. 5 is a front view of the portable communication apparatus illustrated in FIG. 4.

Further, when the first housing 100 and the second housing 200 are opened from each other as illustrated in FIGS. 4 and 5, the first groove 110 and the second groove 210 are located farthest from each other. However, when the first housing 100 and the second housing 200 are closed against each other as illustrated in FIGS. 1 to 3, the first housing 100 and the second housing 200 are in contact with each other, and the first groove 110 and the second groove 210 are opposed to each other, forming a slit which facilitates unfolding of the first housing 100 and the second housing 200 from each other.

Alternatively, only one of the first housing 100 and the second housing 200 can have a groove formed therein for facilitating unfolding of the first housing 100 and the second housing 200 from each other.

The hinge recess 340 has a shape corresponding to that of the stylus and linearly extends along a hinge axis A of the hinge unit 300. More specifically, the hinge recess 340 is formed on a portion of the center hinge arm 330 disposed between the inner surface 100*b* of the first housing 100 and the inner surface 200*a* of the second housing 200.

Further, a plurality of third keys 122 and a first speaker 124 are arranged on a corner of the first housing 100, and a plurality of fourth keys 222 and a second speaker 224 are arranged on a corner of the second housing 200. The third keys 122 and the fourth keys 222 are located symmetrically to each other, with reference to the hinge recess 340. Further, the first speaker 124 and the second speaker 224 also are located symmetrically to each other, with reference to the hinge recess 340.

Referring to FIG. 5, the hinge recess 340 has a curved bottom surface. More specifically, the hinge recess 340 has a semi-cylindrical shape so that a half of the stylus S can be received in the hinge recess 340.

Figure 6A:
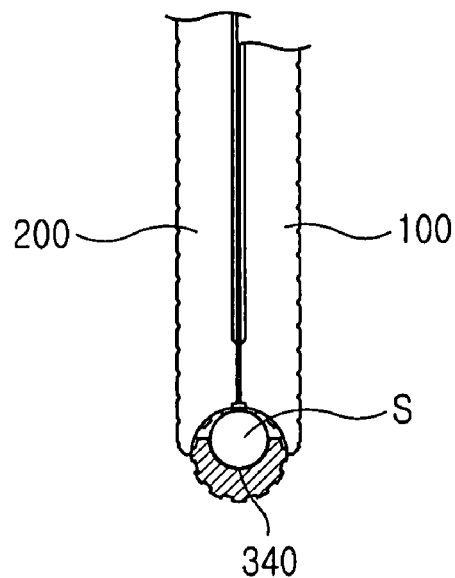
FIGS. 6A to 6C are side views illustrating a process of opening a portable communication apparatus according to a preferred embodiment of the present invention.
Figure 6B:
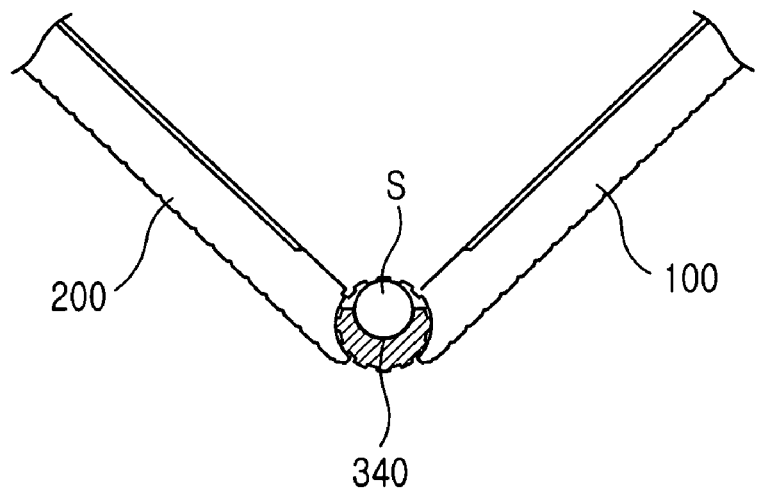
Figure 6C:
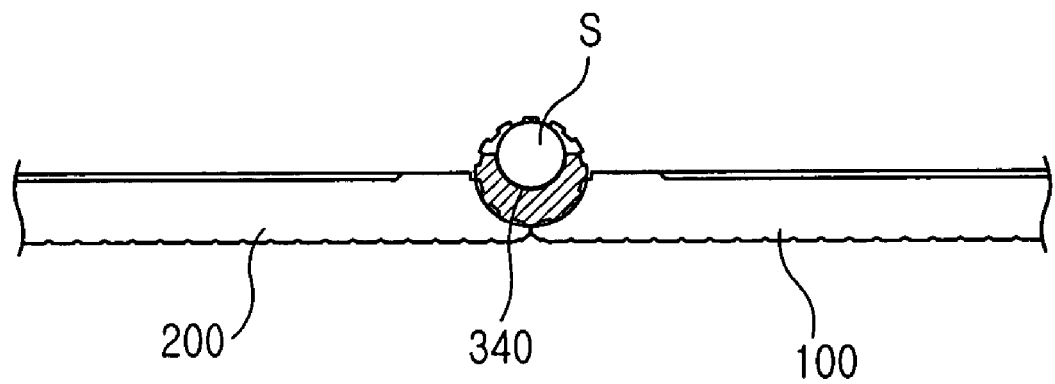

FIGS. 6A to 6C illustrate a process of opening a portable communication apparatus according to a preferred embodiment of the present invention. As is apparent from FIGS. 6A to 6C, the stylus received in the hinge recess 340 is located at a center of the portable communication apparatus when the portable communication apparatus is opened.

As described above, a portable communication apparatus according to the present invention stores a stylus in a safe and convenient manner, safely protects a thin plate-shaped battery from the environment, and includes easily unfoldable first and second housings.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A portable electronic apparatus comprising:
   a first housing having a first inner surface and a first outer surface, the first outer surface receiving a battery;
   a second housing having a second inner surface and a second outer surface;
   a battery cover rotatably coupled with the first housing and being closed in a cover recess formed at the first outer surface for protecting the battery;
   a hinge unit having a hinge axis for connecting the battery cover, the first housing and the second housing, and enabling the first housing and the second housing to open and close from each other; and
   a hinge recess having a semi-cylindrical shape and extending longitudinally in both the first housing and the second housing along the hinge unit at the first and second inner surfaces to receive a stylus therein,
   wherein the first housing includes a first groove positioned at a first outer edge opposite from the hinge unit for facilitating unfolding of the first housing from the second housing, the first groove including at least one first slant surface receiving at least one first function key, and
   wherein the second housing includes a second groove positioned at a second outer edge opposite from the hinge unit for facilitating unfolding of the second housing from the first housing, the second groove including at least one second slant surface receiving at least one second function key.

2. The portable electronic apparatus as claimed in claim 1, wherein the hinge recess extends along the hinge axis.

3. The portable electronic apparatus as claimed in claim 1, wherein, when the first housing and the second housing are closed on each other, the first groove and the second groove are opposed to each other to form a slit that facilitates unfolding of the first housing and the second housing from each other.

4. The portable electronic apparatus as claimed in claim 1, wherein the second housing includes a second groove positioned at an outer edge opposite from the hinge unit for facilitating unfolding of the second housing from the first housing.

5. The portable electronic apparatus as claimed in claim 4, wherein the second groove includes at least one slant surface.

6. The portable electronic apparatus as claimed in claim 5, wherein the at least one slant surface includes at least one function key.

7. The portable communication apparatus as claimed in claim 1, wherein the battery is shaped like a thin plate.

8. A portable electronic apparatus as claimed in claim 1, wherein two touch screens are disposed in the first and second inner surfaces, respectively.

9. A portable electronic apparatus as claimed in claim 8, wherein the touch screens are symmetric with respect to the hinge unit.

* * * * *